US012609062B2

(12) United States Patent
Wu

(10) Patent No.: US 12,609,062 B2
(45) Date of Patent: Apr. 21, 2026

(54) POWER-SAVING IMAGE DISPLAY SYSTEM

(71) Applicant: Himax Technologies Limited, Tainan City (TW)

(72) Inventor: Tung-Ying Wu, Tainan City (TW)

(73) Assignee: Himax Technologies Limited, Tainan City (TW)

( * ) Notice: Subject to any disclaimer, the term of this patent is extended or adjusted under 35 U.S.C. 154(b) by 0 days.

(21) Appl. No.: 18/817,093

(22) Filed: Aug. 27, 2024

(65) Prior Publication Data

US 2026/0065826 A1      Mar. 5, 2026

(51) Int. Cl.
| | |
|---|---|
| *G09G 3/20* | (2006.01) |
| *G06V 10/25* | (2022.01) |
| *G06V 10/44* | (2022.01) |
| *G06V 10/50* | (2022.01) |

(52) U.S. Cl.
CPC .............. *G09G 3/20* (2013.01); *G06V 10/25* (2022.01); *G06V 10/44* (2022.01); *G06V 10/507* (2022.01); *G09G 2320/0626* (2013.01); *G09G 2330/021* (2013.01)

(58) Field of Classification Search
CPC ............. G09G 3/20; G09G 2320/0626; G09G 2330/021; G06V 10/25; G06V 10/44; G06V 10/507
See application file for complete search history.

(56) References Cited

U.S. PATENT DOCUMENTS

| | | | | |
|---|---|---|---|---|
| 2006/0239583 A1* | 10/2006 | Safonov | ................... | H04N 5/20 348/E5.073 |
| 2008/0025635 A1* | 1/2008 | Han | ......................... | G06T 7/38 382/274 |
| 2021/0225323 A1* | 7/2021 | Furihata | ............... | G09G 3/3233 |
| 2023/0066869 A1* | 3/2023 | Kim | ......................... | G06T 5/90 |

* cited by examiner

*Primary Examiner* — Premal R Patel
(74) *Attorney, Agent, or Firm* — Donald E. Stout; Stout, Uxa & Buyan, LLP

(57) ABSTRACT

A power-saving image display system includes a visual feature analyzer that receives input image data and generates a visual feature ratio representing a brightness ratio of a full image to a feature area; a visual feature spatial gain device that generates visual feature spatial gains according to the visual feature ratio and original spatial gains; and a brightness adjustment device that adjusts brightness values of the input image data according to corresponding visual feature spatial gains, thereby generating output image data.

11 Claims, 3 Drawing Sheets

2nd LUT

| | H1 | H2 | ... | H48 | H49 |
|---|---|---|---|---|---|
| V1 | gain 1' | gain 2' | | | |
| ... | | | | | |
| V17 | | | | | gain833' |

2nd visual feature ratio = 1

1st LUT

| | H1 | H2 | ... | H48 | H49 |
|---|---|---|---|---|---|
| V1 | gain 1 | gain 2 | | | |
| ... | | | | | |
| V17 | | | | | gain833 |

1st visual feature ratio = 0

*FIG. 2*

L_feature = 0.8
L_full = 0.5
visual feature ratio = 0.5/0.8 = 0.625
visual feature spatial gain = 0.625*(1-0.5)+0.5 = 0.8125

POWER-SAVING IMAGE DISPLAY SYSTEM

BACKGROUND OF THE INVENTION

1. Field of the Invention

The present invention generally relates to image display, and more particularly to a power-saving image display system adaptable to a display device.

2. Description of Related Art

Saving power in displaying images on a display device is crucial for several reasons. In portable devices like smartphones, tablets, and laptops, power efficiency directly impacts battery life. A display that consumes less power allows the device to operate longer without needing frequent recharging. Whether it's a personal device or an industrial application, reducing power consumption translates to cost savings over time. Energy-efficient displays contribute to reducing overall energy consumption, which is essential for environmental sustainability. By minimizing power usage, we decrease the demand on power plants and reduce greenhouse gas emissions. High power consumption generates heat within the display. Excessive heat can lead to performance issues, affect the lifespan of components, and even cause discomfort for users. Efficient displays produce less heat, contributing to better device reliability. In summary, saving power in display devices benefits users, manufacturers, and the environment by improving battery life, reducing costs, and promoting sustainability. It's a critical consideration in today's technology-driven world.

The observation that viewers primarily focus on the central area of an image on a monitor, leading to the peripheral areas being less significant, is quite insightful. Therefore, displaying the peripheral areas on the monitor is actually a waste of the monitor's energy.

In the pursuit of energy efficiency, a need has thus arisen to propose a novel scheme for display devices focus on minimizing power consumption without substantially compromising image quality, which not only extends the lifespan of the display device but also contributes to the broader goal of energy conservation in electronic devices.

SUMMARY OF THE INVENTION

In view of the foregoing, it is an object of the embodiment of the present invention to provide a power-saving image display system adaptable to a display device, capable of effectively saving power without substantially compromising image quality.

According to one embodiment, a power-saving image display system includes a visual feature analyzer, a visual feature spatial gain device and a brightness adjustment device. The visual feature analyzer receives input image data and generates a visual feature ratio representing a brightness ratio of a full image to a feature area. The visual feature spatial gain device generates visual feature spatial gains according to the visual feature ratio and original spatial gains. The brightness adjustment device adjusts brightness values of the input image data according to corresponding visual feature spatial gains, thereby generating output image data.

BRIEF DESCRIPTION OF THE DRAWINGS

FIG. 2 shows an exemplary spatial gain LUT composed of a first LUT storing original first spatial gains and a second LUT storing original second spatial gains for an image that is divided into 49 blocks in the horizontal direction and 17 blocks in the vertical direction.

DETAILED DESCRIPTION OF THE INVENTION

Figure 1:
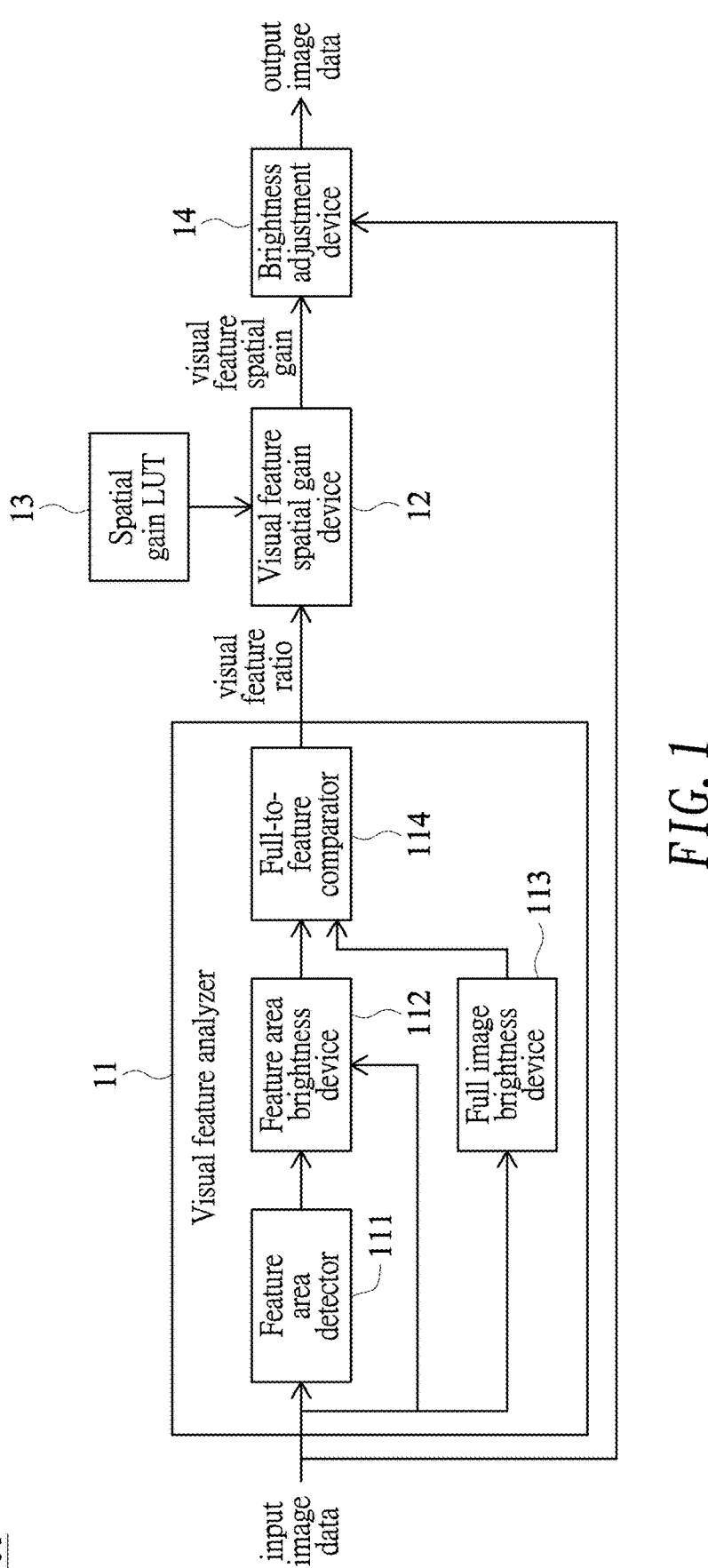
FIG. 1 shows a block diagram illustrating a power-saving image display system adaptable to a display device according to one embodiment of the present invention.

FIG. 1 shows a block diagram illustrating a power-saving image display system 100 adaptable to a display device (e.g., liquid crystal display, organic light-emitting diode display or micro-light-emitting diode display) according to one embodiment of the present invention. The blocks of the power-saving image display system 100 may be implemented by hardware (e.g., circuits), software or their combination. For example, at least some blocks of the power-saving image display system 100 may be performed by a digital image processor, being in the form of an integrated circuit, which receives raw data captured by an image sensor and converts the raw data into input image data.

In the embodiment, the power-saving image display system 100 may include a visual feature analyzer 11 coupled to receive input image data and configured to accordingly generate a visual feature ratio that represents a brightness ratio of a full image to a feature (or interest) area.

The power-saving image display system 100 of the embodiment may include a visual feature spatial gain device 12 coupled to receive the visual feature ratio (from the visual feature analyzer 11) and original spatial gains from a spatial gain lookup table (LUT) 13, and configured to accordingly generate visual feature spatial gains that represent inferred spatial gains associated with the visual feature ratio (generated by the visual feature analyzer 11). It is noted that the original spatial gains of the spatial gain LUT 13 may be obtained by using conventional techniques such as histogram equalization that redistributes pixel intensities to enhance contrast and brightness or gamma correction that adjusts gamma value to control brightness.

In the embodiment, the spatial gain LUT 13 may include a first LUT (storing original first spatial gains) and a second LUT (storing original second spatial gains) respectively associated with a predetermined first visual feature ratio (e.g., zero or "0") and a predetermined second visual feature ratio (e.g., one or "1"). Each of the first LUT and the second LUT may be divided into a plurality of blocks respectively corresponding to corresponding positions of an image. FIG. 2 shows an exemplary spatial gain LUT 13 composed of a first LUT storing original first spatial gains (such as gain1, gain2, etc.) and a second LUT storing original second spatial gains (such as gain1' and gain2', etc.) for an image that is divided into 49 blocks in the horizontal direction and 17 blocks in the vertical direction.

The power-saving image display system 100 of the embodiment may include a brightness adjustment device 14 configured to adjust brightness values of the input image data according to corresponding visual feature spatial gains, thereby generating output image data. In one embodiment, in addition to the visual feature spatial gains, the brightness adjustment device 14 may further adjust the image by applying image spatial gains directly to pixel intensities of the image to fine-tune the image with image-level adjustments. Conventional techniques may be adopted to applying image spatial gains, details of which are thus omitted for brevity.

In the embodiment, the visual feature analyzer 11 may include a feature area detector 111 configured to determine a feature (or interest) area of an (input) image. In one embodiment, a center area with predetermined dimensions is determined as the feature area. In other embodiments, the feature area may be determined based on content analysis, for example, salient features analysis that identifies prominent objects, faces, or visually striking elements; contrast and color analysis that identifies areas with high contrast or vibrant colors tending to attract attention; or edges and lines analysis that identifies edges and leading lines guiding the viewer's gaze.

The visual feature analyzer 11 of the embodiment may include a feature area brightness device 112 configured to generate an average brightness of the feature area. There are various ways to generate the average brightness of the feature area, for example, arithmetic mean that divides sum of brightness values of the feature area by number of values; median middle value that separates the greater and lesser halves of brightness values of the feature area; mode that represents most frequent value in brightness values of the feature area; or mid-range that represents the arithmetic mean of the highest and lowest values of brightness values of the feature area.

The visual feature analyzer 11 of the embodiment may include a full image brightness device 113 configured to generate an average brightness of the full image. There are various ways to generate the average brightness of the full image, for example, arithmetic mean, median middle value, mode or mid-range.

The visual feature analyzer 11 of the embodiment may include a full-to-feature comparator 114 configured to generate the visual feature ratio defined as a ratio of the average brightness of the full image to the average brightness of the feature area.

Subsequently, the visual feature spatial gain device 12 of the embodiment may generate the visual feature spatial gains according to the visual feature ratio and the original spatial gains of the spatial gain LUT 13. Specifically, the visual feature spatial gains may be generated by interpolation (e.g., internal interpolation) between the original first spatial gains associated with the predetermined first visual feature ratio (e.g., zero or "0") in the first LUT and the original second spatial gains associated with the predetermined second visual feature ratio (e.g., one or "1") in the second LUT. Specifically, in the embodiment, the visual feature spatial gain (inferred by interpolation) may be expressed as follows:

visual feature spatial gain=visual feature ratio*(original second spatial gain−original first spatial gain)+original first spatial gain.

Figure 3:
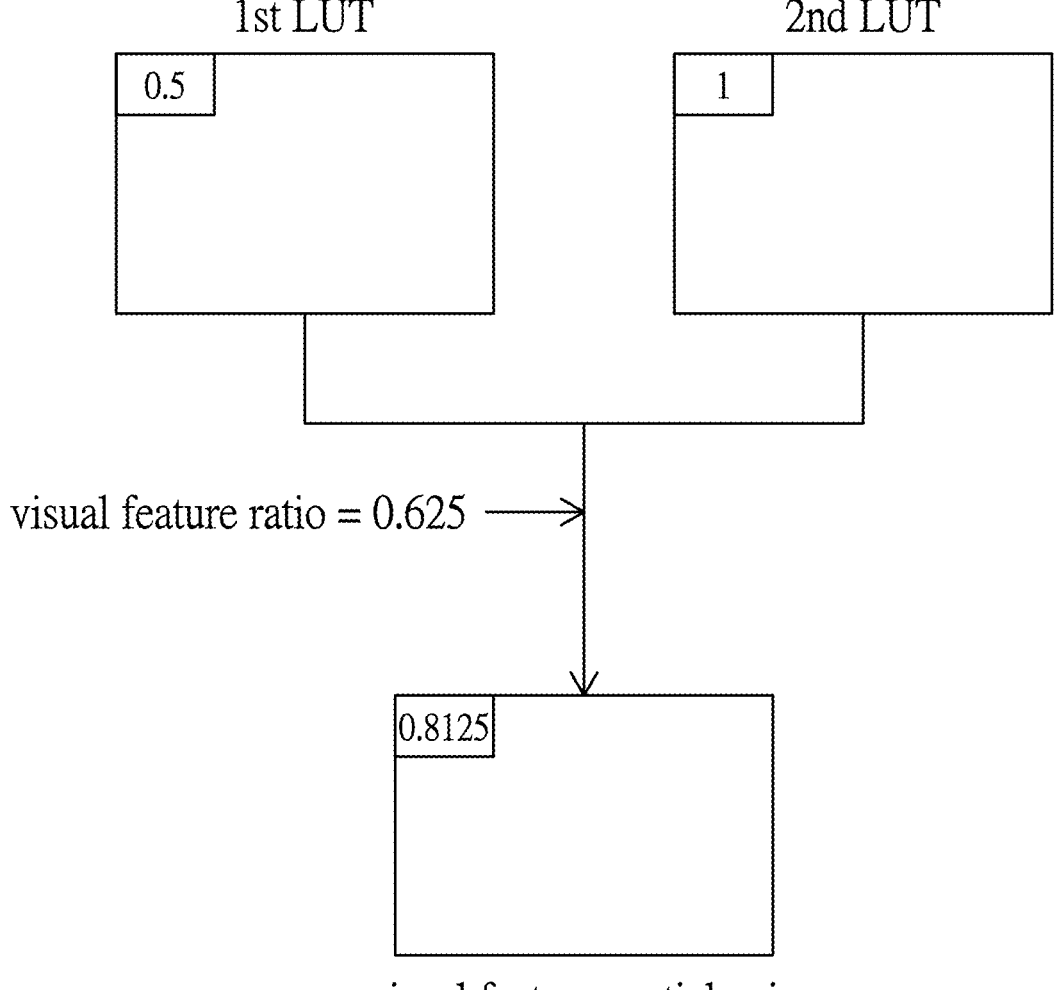
FIG. 3 shows an example of generating a visual feature spatial gain according to an original first spatial gain and an original second spatial gain with a visual feature ratio.

FIG. 3 shows an example of generating a visual feature spatial gain according to an original first spatial gain (located in the upper left corner of the first LUT) and an original second spatial gain (located in the upper left corner of the second LUT) with a visual feature ratio. In the example, the average brightness (L_feature) of the feature area (generated by the feature area brightness device 112) is 0.8, and the average brightness (L_full) of the full image (generated by the full image brightness device 113) is 0.5. Therefore, the visual feature ratio (generated by the full-to-feature comparator 114) is 0.625 (=0.5/0.8), and the visual feature spatial gain (for the upper left corner of the image) is 0.8125 (=0.625*(1−0.5)+0.5).

Finally, the brightness adjustment device 14 may adjust brightness values of the input image data according to corresponding visual feature spatial gains, for example, by a multiplier that multiplies the brightness values (of the input image data) by corresponding visual feature spatial gains, thereby generating (brightness values of) the output image data. In one embodiment, the multiplier of the brightness adjustment device 14 may be implemented by hardware circuits such as operational amplifiers. In an alternative embodiment, the brightness values to be adjusted may be brightness values of a backlight module for a non-emissive display such as a liquid-crystal display.

It is appreciated that, prior to displaying the output image data on a display device (such as liquid crystal display or LCD), the output image data may be further subject to other processes, such as digital gain control (DGC) and dithering, which may be implemented using traditional techniques, details of which are thus omitted for brevity.

Although specific embodiments have been illustrated and described, it will be appreciated by those skilled in the art that various modifications may be made without departing from the scope of the present invention, which is intended to be limited solely by the appended claims.

What is claimed is:

1. A power-saving image display system, comprising:
a visual feature analyzer implemented by a circuit or processor coupled to receive input image data and configured to generate a visual feature ratio representing a brightness ratio of a full image to a feature area and being defined as a ratio of an average brightness of the full image to an average brightness of the feature area;
a visual feature spatial gain device that generates visual feature spatial gains according to the visual feature ratio and original spatial gains; and
a brightness adjustment device that adjusts brightness values of the input image data according to corresponding visual feature spatial gains, thereby generating output image data.

2. The system of claim 1, wherein the visual feature analyzer comprises a feature area detector implemented by a circuit or processor configured to execute content analysis, contrast and color analysis, or edges and lines analysis to determine the feature area.

3. The system of claim 1, wherein the visual feature analyzer comprises:
a feature area brightness device implemented by a circuit or processor configured to execute arithmetic mean, median middle value, mode, or mid-range operations on the feature area to generate the average brightness of the feature area; and
a full image brightness device implemented by a circuit or processor configured to execute arithmetic mean, median middle value, mode, or mid-range operations on the full image to generate the average brightness of the full image.

4. The system of claim 3, wherein the visual feature analyzer comprises a full-to-feature comparator that generates the visual feature ratio defined as a ratio of the average brightness of the full image to the average brightness of the feature area.

5. The system of claim 1, further comprising:
a spatial gain lookup table (LUT) that stores the original spatial gains.

6. The system of claim 5, wherein the spatial gain LUT comprises:

a first LUT that stores original first spatial gains associated with a predetermined first visual feature ratio; and a second LUT that stores original second spatial gains associated with a predetermined second visual feature ratio;

wherein each of the first LUT and the second LUT is divided into a plurality of blocks respectively corresponding to corresponding positions of an image.

7. The system of claim 6, wherein the predetermined first visual feature ratio is zero, and the predetermined second visual feature ratio is one.

8. The system of claim 6, wherein the visual feature spatial gain device generates the visual feature spatial gains by interpolation between the original first spatial gains and the original second spatial gains.

9. The system of claim 8, wherein a visual feature spatial gain is expressed as follows:

$$\text{visual feature spatial gain} = \text{visual feature ratio} * (\text{original second spatial gain} - \text{original first spatial gain}) + \text{original first spatial gain}.$$

10. The system of claim 8, wherein the interpolation comprises internal interpolation performed on the original first spatial gains and the original second spatial gains.

11. The system of claim 1, wherein the brightness adjustment device comprises a multiplier that multiplies the brightness values of the input image data by corresponding visual feature spatial gains.

\* \* \* \* \*